United States Patent
Sandstrom et al.

(10) Patent No.: US 7,671,126 B1
(45) Date of Patent: Mar. 2, 2010

(54) TIRE WITH TREAD

(75) Inventors: Paul Harry Sandstrom, Cuyahoga Falls, OH (US); Steven Wayne Cronin, Akron, OH (US); Thomas Charles Lippello, III, Fairlawn, OH (US); Mark Alan Keto, Ravenna, OH (US); Larry Alan Kraus, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/327,074

(22) Filed: Dec. 3, 2008

(51) Int. Cl.
*C08K 3/04* (2006.01)

(52) U.S. Cl. .................. 524/495; 524/493; 524/496; 524/573; 524/574; 524/575.5; 156/112; 156/118

(58) Field of Classification Search ................. 156/112, 156/118; 524/573, 574, 575.5, 493, 495, 524/496
See application file for complete search history.

(56) References Cited

U.S. PATENT DOCUMENTS

| | | | | |
|---|---|---|---|---|
| 4,089,718 | A * | 5/1978 | Triolo et al. ................. | 156/122 |
| 2005/0209394 | A1* | 9/2005 | Sandstrom et al. .......... | 524/496 |
| 2006/0289098 | A1* | 12/2006 | Balogh et al. ............... | 152/310 |

* cited by examiner

*Primary Examiner*—Ling-Siu Choi
(74) *Attorney, Agent, or Firm*—Henry C. Young, Jr.

(57) ABSTRACT

The invention relates to a tire having a tread which contains coal dust to promote a fast wearing tread running surface designed to expel internally heated tread rubber.

2 Claims, No Drawings

TIRE WITH TREAD

FIELD OF THE INVENTION

The invention relates to a tire having a tread which contains coal dust to promote a fast wearing tread running surface designed to expel internally heated tread rubber.

BACKGROUND OF THE INVENTION

High performance tires intended to run at high speeds for relatively short distances typically have thin treads which are expected to experience a high rate of internal heat generation.

A challenge is presented to provide such a tread which can dissipate internally generated heat when the tire is run at high speeds.

For this invention, a fast wearing tread is proposed in which such internally generated heat is dissipated by expelling (wearing away, or exfoliating) the tread running surface to both remove heated rubber from the tread at its running surface (to dissipate tread rubber heat buildup) and, also, to thereby reduce the tread volume in which internal heat is generated (to further reduce tread rubber heat buildup).

In another aspect of the invention, the tread rubber is less hysteretic to reduce internal heat generation (thereby reduce internal heat build up and build up of operating temperature of the rubber composition) as the tire is being run.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a tire is provided with a circumferential tread of a rubber composition comprised of, based upon parts by weight per 100 parts by weight rubber (phr):

(A) at least one conjugated diene-based elastomer (B) about 20 to about 170, alternately about 20 to about 100 and further alternately from about 35 to about 70, phr of reinforcing filler and coal dust for said tread rubber composition wherein said reinforcing filler is comprised of:

(1) about 5 to about 150, alternately about 25 to about 90 and further alternately from about 10 to about 50, phr of particulate, rubber reinforcing carbon black having a DBP (dibutyl phthalate) adsorption value (ASTM D2414) in a range of from about 90 to about 170, alternately from about 90 to about 135, cc/100 g together with an Iodine adsorption value (ASTM D1510) in a range of from about 75 to about 230, alternately from about 75 to about 145, m$^2$/g.

(2) about 2 to about 40, alternately about 2 to about 20 and further alternately from about 2 to about 10, phr of coal dust, and (3) optionally from zero up to about 40, alternately from about 5 to about 35, phr of precipitated silica (synthetic amorphous silica).

If desired, the precipitated silica, if used, may be accompanied with a coupling agent having a moiety reactive with hydroxyl groups on said precipitated silica and another different moiety interactive with carbon-to-carbon double bonds of said diene-based elastomer to enhance a rubber reinforcing effect of the precipitated silica.

However, such inclusion of a coupling agent is preferably not desired in order to limit the rubber reinforcing ability of the silica and to thereby promote a fast wearing of the tread running surface. In other words, it is preferred that the precipitated silica is used without (e.g. is used exclusive of) a coupling agent.

In practice, said tread is a thin tread desirably having a maximum thickness of about 12, alternately a maximum of about 4, mm (millimeters). Its thickness may range, for example, from about 1.2 to about 12, alternately from about 1.2 to about 4, millimeters (mm).

A significant aspect of the invention is the providing of a tire tread with a fast wearing running rubber surface by providing the tread running surface rubber composition with reinforcement comprised of a combination of:

(A) rubber reinforcing carbon black of defined structure (the aforesaid DBP absorption value range) and surface area (the aforesaid Iodine absorption value range), (B) coal dust, and (C) optional precipitated silica.

This is considered herein to be a significant departure from past practice in a sense of providing a high performance tread with a means of reducing its heat build up by exfoliating its running surface as the tire is being run.

Coal dust is a carbonaceous dust from naturally occurring coal. It might sometimes be referred to as being coal fines. Coal dust is of significantly greater size (significantly greater average diameter) than rubber reinforcing carbon black and is not rubber reinforcing in the sense of rubber reinforcing carbon black. It can therefore sometimes be used in significantly greater quantities in a rubber composition than rubber reinforcing carbon black without significantly affecting the processing viscosity of the rubber composition, yet being beneficial for the rubber composition in the sense of promoting a faster wear of the tread running surface to thereby dissipate internally generated heat from the tire tread. Further, lower internal heat generation is promoted due to the relatively non-rubber reinforcing ability of the coal dust and precipitated silica.

Representative examples of the optional rubber reinforcing carbon blacks are found in *The Vanderbilt Rubber Handbook*, 1978, Page 417, including their ASTM designations.

Representative of rubber reinforcing carbon black having the aforesaid DBP and Iodine absorption values are, for example, N330, N120, N121 and N134 according to their ASTM designations.

In the practice of this invention, the tread of the tire may be a rubber composition comprised of various conjugated diene based elastomers. Such diene-based elastomers may be comprised of at least one of polymers and copolymers of conjugated dienes, such as, for example, isoprene and 1,3-butadiene, and copolymers of vinyl aromatic compound selected from styrene and alphamethyl styrene, preferably styrene and at least one conjugated diene such as, for example, isoprene and 1,3-butadiene.

Representative examples of said elastomers may be, for example, cis 1,4-polyisoprene rubber (natural and synthetic), cis 1,4-polybutadiene rubber, vinyl polybutadiene rubber having a vinyl 1,2 content in a range of about 20 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 20 to about 90 percent based on its polybutadiene derived portion and a bound styrene content in a range of about 10 to about 60 percent based upon the copolymer, styrene/isoprene/butadiene terpolymer rubber, butadiene/ acrylonitrile rubber, styrene/isoprene copolymer and isoprene/butadiene copolymer rubber, 3,4-polyisoprene rubber and trans 1,4-polybutadiene rubber.

For the purpose of this invention, it may be desired that natural rubber (natural cis 1,4-polyisoprene) is the rubber used for the tire tread.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated herein.

The tires can be built, shaped, molded and cured by various methods which will be readily apparent to those having skill in such art.

The following example is presented in order to illustrate but not limit the present invention. The parts and percentages are by weight unless otherwise indicated.

EXAMPLE I

Samples of rubber compounds (rubber compositions) were prepared to answer the challenge of providing a tire with an ability to dissipate internally generated heat and, further, a tire with less tendency to internally generate heat.

The ability to dissipate heat is predicated on providing a rubber composition which can expel heat by exfoliating rubber from a tire tread running surface.

For such challenge, rubber Samples were prepared to evaluate an effect of an inclusion of a dispersion of coal dust and a combination of coal dust and precipitated silica in a tread rubber composition.

Rubber Sample A is a Control rubber sample which relies upon rubber reinforcing carbon black for its reinforcing filler.

Rubber Samples B through E are Experimental rubber Samples which contain various amounts of ground coal dust.

Rubber Samples C, D and E contain a combination of ground coal dust and precipitated silica. The precipitated silica is used without a coupling agent in order to limit the rubber reinforcing effect of the precipitated silica.

For Experimental Sample B about half of the rubber reinforcing carbon black was replaced with ground coal dust.

For Experimental Sample C, Experimental Sample B was modified in a sense that precipitated silica replaced a significant portion of the remaining rubber reinforcing carbon black.

For Experimental Rubber Sample D, Experimental Sample C was modified in a sense that precipitated silica replaced an even greater portion of the rubber reinforcing carbon black and, also, the content of ground coal dust was reduced.

For Experimental Rubber Sample E, Experimental Sample D was modified in a sense that the rubber reinforcing carbon black was eliminated and the ground coal dust is increased.

The following Table 1 is illustrative of the respective rubber Samples (amounts rounded).

The materials may be mixed in a sequential two-step mixing process, namely a non-productive mixing step, followed by a productive mixing step in an internal rubber mixer, in which all of the ingredients, except for sulfur and accelerators, are mixed in the first, non-productive mixing step and the sulfur and accelerators are added in the subsequent productive mixing step in an internal rubber mixer. The rubber mixtures are dumped from the respective rubber mixers and cooled to below 40° C. between mixing steps. Such sequential procedural non-productive and productive rubber mixing steps are well known to those having skill in such art.

TABLE 1

|  | Control | Experiments | | | |
|---|---|---|---|---|---|
|  | A | B | C | D | E |
| Non-Productive Mixing Step (NP) | | | | | |
| Natural cis 1,4-polyisoprene rubber[1] | 100 | 100 | 100 | 100 | 100 |
| Rubber reinforcing carbon black N330[2] | 63 | 30 | 20 | 10 | 0 |
| Ground coal dust[3] | 0 | 30 | 30 | 20 | 35 |
| Precipitated silica[4] | 0 | 0 | 20 | 30 | 30 |
| Zinc oxide | 8 | 8 | 8 | 8 | 8 |
| Fatty acid[5] | 2 | 2 | 2 | 2 | 2 |
| Antioxidant[6] | 1 | 1 | 1 | 1 | 1 |
| Processing oil | 14 | 14 | 14 | 14 | 14 |
| Productive Mixing Step (P) | | | | | |
| Sulfur | 1 | 1 | 1 | 1 | 1 |
| Sulfur cure accelerators[7] | 3 | 3 | 3 | 3 | 3 |

[1]Natural cis 1,4-polyisoprene rubber, SMR-20
[2]Rubber reinforcing carbon black as N330, an ASTM designation
[3]Ground coal dust as Austin Black 325 ™ TM from Coal Fillers
[4]Precipitated silica as HiSil 210 ™ TM from PPG Industries
[5]Fatty acid comprised primarily of stearic acid, palmitic acid and oleic acid
[6]Amine based antidegradant
[7]Thiocarbamate and benzothiazole based sulfur vulcanization accelerators The following Table 2 reports physical data for various physical properties of the Samples. For cured rubber samples, the respective samples were cured for about 23 minutes to a temperature of about 170° C.

TABLE 2

|  | Control | Experiments | | | |
|---|---|---|---|---|---|
|  | A | B | C | D | E |
| Rubber reinforcing carbon black (phr) | 63 | 30 | 20 | 10 | 0 |
| Coal dust (phr) | 0 | 30 | 20 | 20 | 35 |
| Precipitated silica (phr) | 0 | 0 | 20 | 30 | 30 |
| Stress-strain (ATS)[1] | | | | | |
| 300% modulus, ring (MPa) | 17 | 9.2 | 8.3 | 7.1 | 5.9 |
| Elongation at break (%) | 412 | 465 | 491 | 572 | 559 |
| RPA[2], (100° C., 1 hz) | | | | | |
| Storage modulus G' (1% strain), MPa | 3 | 1.6 | 1.6 | 1.4 | 1 |
| Storage modulus G' (10% strain), MPa | 1.7 | 1.3 | 1.2 | 1.2 | 0.9 |
| Loss compliance J" MPa | 0.10 | 0.09 | 0.05 | 0.05 | 0.03 |
| Tan.Delta (100° C., 1 hertz, 10% strain) | 0.19 | 0.09 | 0.08 | 0.07 | 0.03 |
| Tear Strength[3] (N) | | | | | |
| At 95° C. | 50 | 14 | 20 | 50 | 50 |
| Abrasion rate, Grosch[4] (mg/km) | | | | | |
| Low severity (20N), 2° slip angle, disk | | | | | |

TABLE 2-continued

|  | Control | Experiments | | | |
| --- | --- | --- | --- | --- | --- |
|  | A | B | C | D | E |
| speed = 40 km/hr, distance = 7,500 meters Medium severity (40N), 6° slip angle, disk | 5.7 | 36.7 | 33 | 15.3 | 22.5 |
| speed = 20 km/hr, distance = 1,000 meters High severity (70N), 12° slip angle, disk | 64 | 606 | 519 | 242 | 472 |
| speed = 20 km/hr, distance = 250 meters | 560 | 3944 | 4987 | 4516 | 4768 |

[1]Data according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[2]Rubber Process Analyzer (RPA)
[3]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.
[4]The Grosch abrasion rate determination was run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). Frictional forces, both lateral and circumferential, generated by the abrading sample can be measured together with the load (Newtons) using a custom tri-axial load cell. The surface temperature of the abrading wheel is monitored during testing and reported as an average temperature.

In practice, a Low abrasion severity test may be run, for example, at a load of 20 Newtons at a slip angle of 2 degrees and a disk speed of 40 kph (kilometers per hour) at a sample travel of 7,500 m. A Medium abrasion severity test may be run, for example, at a load of 40 Newtons at a slip angle of 6 degrees and a disk speed of 20 kph and a sample travel of 1,000 m. A High abrasion severity test may be run, for example, at a load of 70 Newtons at a slip angle of 12 degrees and a disk speed of 20 kph and a sample travel of 250 m.

From Table 2 it is observed that for Sample B, which contained an inclusion of 30 phr of coal dust, replacing a portion of the rubber reinforcing carbon black, provided a desirably increased abrasion rate yet, however, provided a significantly reduced tear strength as compared to control Sample A with rubber reinforcing carbon black which did not contain the coal dust.

From Table 2 it is further observed for Sample C, which contained an inclusion of both coal dust and precipitated silica (without a coupling agent for the silica), together with the rubber reinforcing carbon black, also provided a desirably increased abrasion rate, as compared to Control Sample A, and a slightly improved tear strength as compared to Sample B (which did not contain the silica) thereby indicating a possible desirability of the inclusion of the precipitated silica where enhanced tear strength of the tread rubber composition may be desired.

From Table 2, it is additionally observed that, for Sample D, which contained an increased amount of precipitated silica (without a coupling agent for the silica), together with the coal dust inclusion, also provided a desirably increased abrasion rate, as compared to Control Sample A, and significantly improved tear strength comparable to the tear strength of the Control rubber Sample A thereby indicating a possible desirability of the inclusion of the increased amount of precipitated silica where enhanced tear strength may be desired.

From Table 2, it is further observed that, for Sample E, in which the rubber reinforcing carbon black is eliminated, and the coal dust inclusion is increased to replace the rubber reinforcing carbon black, and which also contained the inclusion of the precipitated silica (without a coupling agent for the silica), provided a desirably increased abrasion rate, as compared to Control Sample A, and a tear strength comparable to the tear strength of the Control rubber Sample A. However, the 300 percent modulus and dynamic storage modulus (G') were significantly reduced to thereby indicate the desirable inclusion of the rubber reinforcing carbon black.

Accordingly, it is considered herein that a tire having a tread of the rubber composition of Sample D would provide a fast wearing tire tread running surface to dissipate internally generated heat by expelling heated tread rubber as the tire is being run.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a circumferential thin tread with a thickness in a range of from about 1.2 mm to about 12 mm composed of a rubber composition which is comprised of, based upon parts by weight per 100 parts by weight rubber (phr):
    (A) at least one conjugated diene-based elastomer comprised of polymers and copolymers of isoprene and 1,3-butadiene; copolymers of styrene and at least one of isoprene and 1,3-butadiene; and natural cis 1,4-polyisoprene rubber;
    (B) about 20 to about 100 phr of reinforcing filler and coal dust for said tread rubber composition comprised of:
        (1) about 5 to about 50 phr of particulate, rubber reinforcing carbon black having a DBP (dibutyl phthalate) adsorption value in a range of from about 90 to about 170 cc/100 g together with an Iodine adsorption value in a range of from about 75 to about 230 m$^2$/g.
        (2) about 2 to about 40 phr of coal dust, and
        (3) about 5 to about 35 phr of precipitated silica without silica coupling agent.
2. The tire of claim 1 wherein diene-based elastomer is comprised of natural cis 1,4-polyisoprene rubber.

* * * * *